United States Patent [19]

Kunishige

[11] Patent Number: 5,412,448
[45] Date of Patent: May 2, 1995

[54] TEMPERATURE COMPENSATION APPARATUS FOR CAMERA

[75] Inventor: Keiji Kunishige, Hachoji, Japan

[73] Assignee: Olympus Optical Co., Ltd., Tokyo, Japan

[21] Appl. No.: 225,254

[22] Filed: Apr. 8, 1994

Related U.S. Application Data

[63] Continuation of Ser. No. 32,448, Mar. 16, 1993, abandoned, which is a continuation of Ser. No. 710,054, Jun. 4, 1991, abandoned.

[30] Foreign Application Priority Data

Jun. 11, 1990 [JP] Japan .................. 2-152407

[51] Int. Cl.⁶ ............................................. G03B 13/36
[52] U.S. Cl. ........................... 354/400; 354/428; 354/464
[58] Field of Search ............................ 354/402–409, 354/428, 468, 464, 400

[56] References Cited

U.S. PATENT DOCUMENTS

| | | | |
|---|---|---|---|
| 4,772,912 | 2/1988 | Ishida et al. | 354/402 |
| 4,828,383 | 5/1989 | Kunishige et al. | 354/403 |
| 4,866,471 | 9/1989 | Ikuta | 354/468 |
| 5,005,970 | 4/1991 | Kunishige | 354/403 |
| 5,162,836 | 11/1992 | Ishimaru | 354/403 |

FOREIGN PATENT DOCUMENTS

57-64204 4/1982 Japan.
1-288806 11/1989 Japan.
2-1524 1/1990 Japan.

Primary Examiner—Russell E. Adams
Attorney, Agent, or Firm—Frishauf, Holtz, Goodman & Woodward

[57] ABSTRACT

A camera having a temperature compensating function includes a first IC incorporating a driver for driving a motor for performing focus adjustment of a photographing lens, and a second IC incorporating a distance measuring circuit for measuring a distance to an object to be photographed, and a temperature measuring circuit for measuring the ambient temperature. The first IC generates a larger amount of heat than the second IC because of a driving current supplied to the motor. In the camera, ambient temperature data measured by the temperature measuring circuit immediately after power is supplied to the second IC is stored in a memory, and a CPU performs a correction operation with respect to object distance data output from the distance measuring circuit on the basis of the ambient temperature data stored in the memory, thus obtaining the driving amount of the photographing lens. The motor is controlled through the driver incorporated in the first IC on the basis of the driving amount of the photographing lens calculated by the CPU.

21 Claims, 10 Drawing Sheets

TEMPERATURE COMPENSATION APPARATUS FOR CAMERA

This application is a continuation of application Ser. No. 08/032,448, filed Mar. 16, 1993, which is a continuation application of Ser. No. 07/710,054, filed Jun. 4, 1991 (both abandoned).

BACKGROUND OF THE INVENTION

1. Field of the Invention

The present invention relates to a temperature compensation apparatus for a camera and, more particularly, to a temperature compensation apparatus for performing temperature compensation for a camera whose characteristics change with the ambient temperature.

2. Description of the Related Art

Recently, with the widespread use of molded parts for a camera body and the like, the positional relationship of the optical components of a camera has been greatly influenced by temperature. For example, the refractive index of a plastic lens or the like, which is increasingly used nowadays, changes with temperature. For this reason, the focal point of the lens may be greatly shifted depending on the ambient temperature, and a high-quality photograph cannot be obtained.

Under the circumstances, a technique has been developed to obtain high-quality photographs (for example, Published Unexamined Japanese Patent Application Nos. 57-64204 and 1-288806). In this technique, the ambient temperature is measured in advance, and focus adjustment with temperature compensation is performed.

Temperature compensation is applied to other techniques. For example, since a load torque in a film wind-up operation changes with temperature, a driving voltage to a film wind-up motor is changed in accordance with temperature. Furthermore, in order to make the contrast of a liquid crystal element constant with respect changes in temperature, a voltage applied to the liquid crystal element is changed in accordance with temperature. In order to eliminate the influences of temperature, it is very important to accurately measure the ambient temperature.

As described above, for a proper operation of a camera, the ambient temperature must be accurately measured. As a method of measuring the ambient temperature, a method is disclosed (e.g., Published Unexamined Japanese Patent Application No. 57-64204), in which a temperature-measuring resistive element such as a thermistor is arranged near a member requiring temperature compensation to measure the ambient temperature.

If, however, the ambient temperature is to be measured by using such a temperature-measuring resistive element, the following disadvantages are posed. In an apparatus having limitations in terms of space and cost, such as a camera in which reductions in size and cost are important, it is not desirable to store a temperature measuring unit constituted by a temperature measuring resistive element and associated elements. Such an arrangement is not desirable also in terms of cost.

SUMMARY OF THE INVENTION

It is, therefore, an object of the present invention to provide a temperature compensation apparatus for a camera, which can provide great merits in terms of space and cost for a camera in which reductions in size and cost are important.

According to an aspect of the present invention, there is provided a camera having a temperature compensating function, comprising a motor for performing focus adjustment of a photographing lens, a first IC which incorporates a driver for driving the motor and generates a large amount of heat due to a driving current of the motor, a second IC which incorporates a distance measuring circuit for measuring a distance to an object to be photographed and a temperature measuring circuit for measuring an ambient temperature, and generates a smaller amount of heat than the first IC, a memory for storing ambient temperature data measured by the temperature measuring circuit immediately after power is supplied to the second IC, operation means for performing a correcting operation with respect to object distance data output from the distance measuring circuit on the basis of the ambient temperature data stored in the memory, thereby obtaining a driving amount of the photographing lens, and control means for controlling the motor through the driver incorporated in the first IC on the basis of the driving amount, of the photographing lens, which is calculated by the operation means.

According to another aspect of the present invention, there is provided a camera having a temperature compensating function, comprising a motor for performing focus adjustment of a photographing lens, a driver for driving the motor, a distance measuring circuit for measuring a distance to an object to be photographed, a temperature measuring circuit for measuring an ambient temperature, a memory for storing ambient temperature data, which is measured by the temperature measuring circuit, at a timing immediately after power is supplied to the temperature measuring circuit, operation means for performing a correcting operation with respect to object distance data output from the distance measuring circuit on the basis of the ambient temperature data stored in the memory, thereby obtaining a driving amount of the photographing lens, and control means for controlling the motor through the driver on the basis of the driving amount, of the photographing lens, which is calculated by the operation means.

According to still another aspect of the present invention, there is provided a camera having a temperature compensating function, comprising an actuator for driving a camera element, a first IC incorporating a driver for driving the actuator, a temperature measuring circuit, arranged in a second IC for performing distance measurement, photometry, or communication, for measuring an ambient temperature, storage means for storing ambient temperature data, which is measured by the temperature measuring circuit, immediately after power is supplied to the second IC, operation means for performing a correcting operation with respect to a driving amount of the at least one actuator on the basis of the ambient temperature data stored in the storage means, and control means for controlling the at least one actuator through the driver incorporated in the first IC on the basis of the driving amount corrected by the operation means.

According to a further aspect of the present invention, there is provided a camera having a temperature compensating function, comprising a temperature measuring circuit, incorporated in a portion of a camera control IC, for measuring an ambient temperature, storage means for storing ambient temperature data, which is measured by the temperature measuring circuit, immediately after power is supplied to the IC, and control means for controlling the camera by using the stored ambient temperature data.

According to still another aspect of the present invention, there is provided a camera having a first IC which generates a large amount of heat, and a second IC which generates a smaller amount of heat than the first IC, comprising a temperature measuring circuit, arranged in the second IC, for measuring an ambient temperature, and control means for controlling the camera by using ambient temperature data measured by the temperature measuring circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENT

In the present invention, the ambient temperature is measured by measuring electrical outputs corresponding to changes in temperature, which are generated in an IC (integrated circuit), without using a temperature-measuring resistive element as in a conventional technique.

With recent advances in electronic cameras, a plurality of ICs are incorporated in a camera: an interface IC (to be referred to as an IFIC hereinafter) incorporating a motor driver and the like, an automatic focusing IC (to be referred to as an AFIC hereinafter) for performing automatic focusing control, a photometric IC for measuring a light amount, a remote control signal receiving IC for receiving a remote control signal, and the like. These ICs generally include an IC having a temperature measuring section for generating electrical outputs corresponding to changes in temperature. Therefore, a temperature dependent output is extracted from the temperature measuring Section in this IC, and the ambient temperature is measured on the basis of the extracted output.

Temperature measurement information output from the temperature measuring section is stored in a storage section. A correcting operation is performed with respect control data (e.g., distance measurement operation result or photometric result) for a control target member of the camera on the basis of the stored temperature information. Subsequently, the control target member is controlled on the basis of the operation result.

Embodiments of the present invention will be described with reference to the accompanying drawings.

Figure 1:
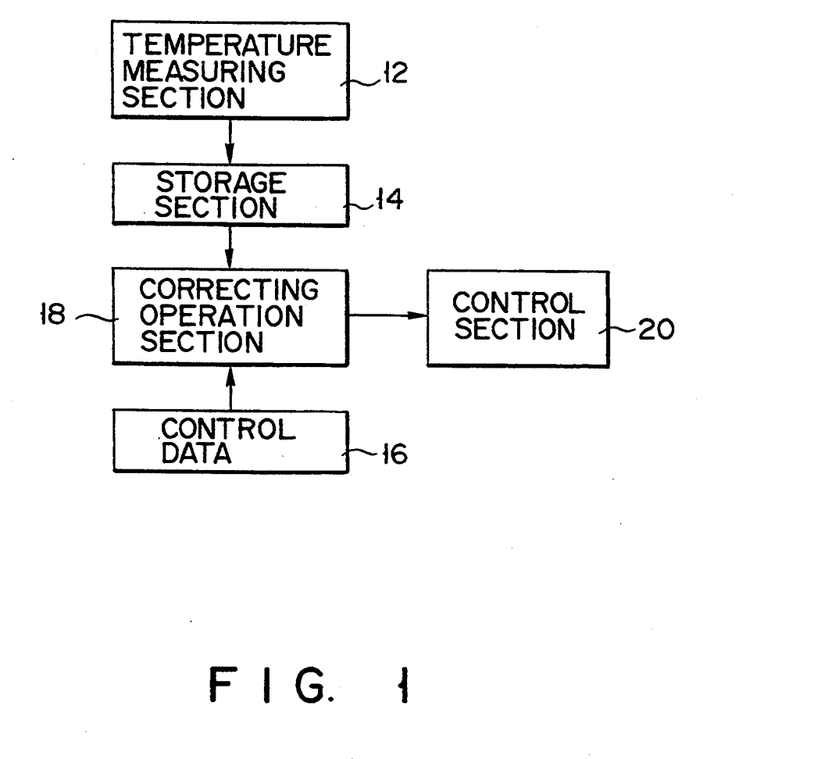
FIG. 1 is a block diagram showing a schematic arrangement of a temperature compensation apparatus for a camera according to the present invention.

FIG. 1 shows a schematic arrangement of an apparatus of the present invention. This apparatus comprises: a temperature measuring section 12 arranged in a camera IC, which generates a relatively small amount of heat, such as an AFIC, a photometric IC, or a remote control signal receiving IC; a storage section 14 for storing temperature measurement information output from the temperature measuring section 12; a correcting operation section 18 for performing a correcting operation with respect to control data 16, e.g., a distance measurement result or a photometric result for a control target member of the camera on the basis of the temperature measurement information stored in the storage section 14; and a control section 20 for controlling the control target member on the basis of the operation result obtained by the correcting operation section 18. Temperature measurement by the temperature measuring section 12 is performed, for example, immediately after power is supplied to the camera IC, and the temperature measurement information is stored in the storage section 14.

Figure 2:
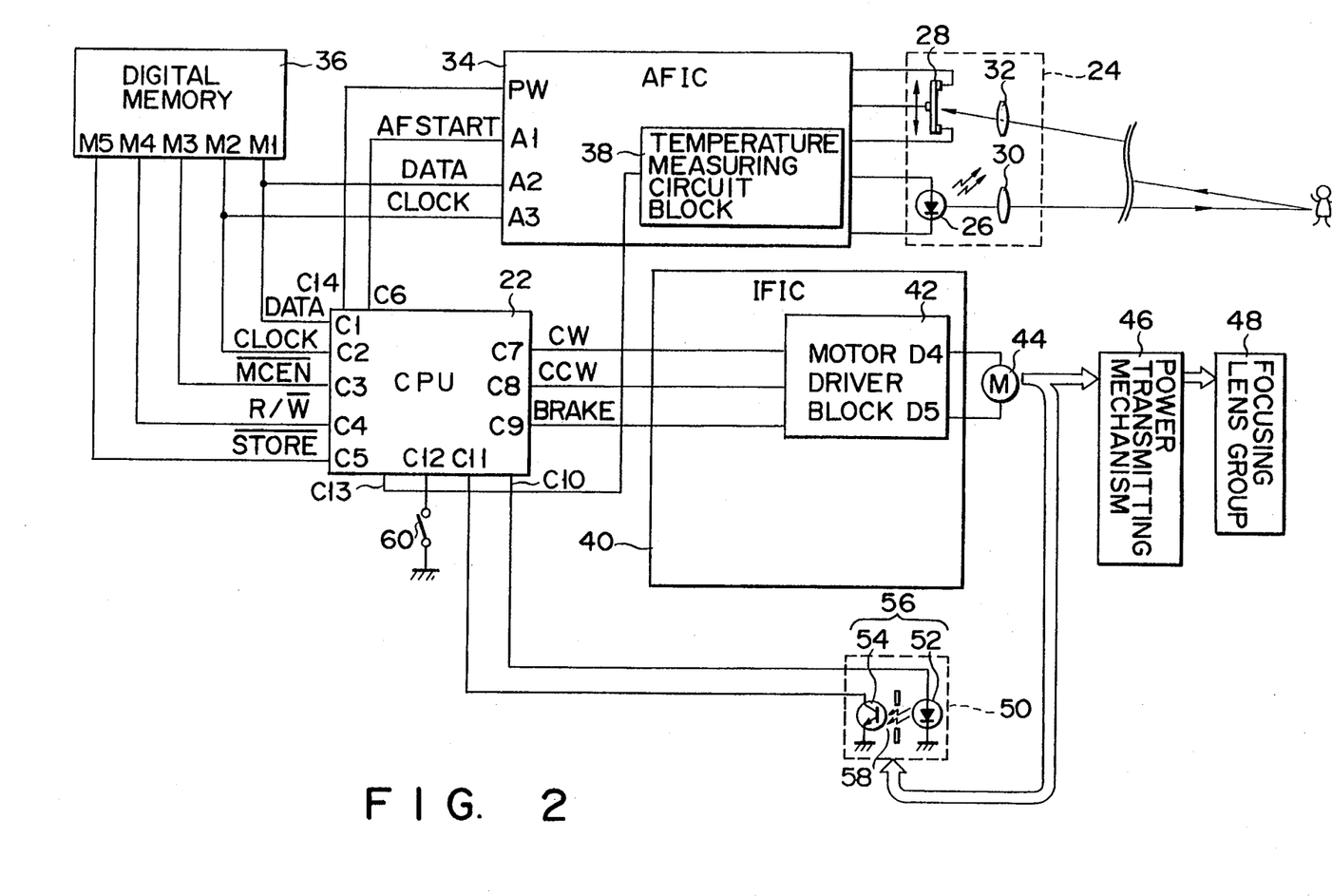
FIG. 2 is a block diagram, showing the overall arrangement, for explaining the first embodiment of the present invention.

FIG. 2 shows a detailed arrangement of an embodiment of the present invention, specifically the first embodiment in which the present invention is applied to temperature compensation for, e.g., forward moving control in the AF mode.

Referring to FIG. 2, a CPU 22 controls a sequence of a camera. A distance measuring unit 24 obtains a distance to an object to be photographed on the basis of the principle of triangulation. The unit 24 comprises a light-emitting element (e.g., a light-emitting diode) 26, a PSD (Position Sensitive Detector) 28, a projection lens 30, and a light-receiving lens 32.

An AFIC 34 serves to drive the distance measuring unit 24. When a signal AFSTART from a terminal C6 of the CPU 22 is input to a terminal A1, distance measurement is started. When the distance measurement is completed, the AFIC 34 converts the distance measurement data corresponding to the distance to the object into serial data, and supplies it from terminals A2 and A3 to terminals C1 and C2 of the CPU 22 through signal lines DATA and CLOCK.

In this embodiment, the control data 16 corresponds to, e.g., distance measurement data output from the AFIC 34.

A digital memory 36 as the storage section 14 stores ambient temperature data obtained by the temperature measuring section 12. This digital memory 36 incorporates, e.g., an EEPROM (Electrically Erasable Programmable ROM). When signals $\overline{\text{MCEN}}$, R/$\overline{\text{W}}$, and $\overline{\text{STORE}}$ are input from terminals C3, C4, and C5 of the CPU 22 to terminals M3, M4, and M5 of the digital memory 36, data read and write operations are controlled.

The temperature measuring section 12 outputs an electrical signal associated with an IC temperature. In this embodiment, the section 12 corresponds to a temperature measuring circuit block 38 in the AFIC 34. An output voltage from the temperature measuring circuit block 38 is applied, as an analog amount, to a terminal C13 of the CPU 22 and is converted into a digital amount by an A/D converter incorporated in the CPU 22. The digital amount is then converted into a digital code corresponding to the measured temperature and is stored in the digital memory 36.

Figure 3:
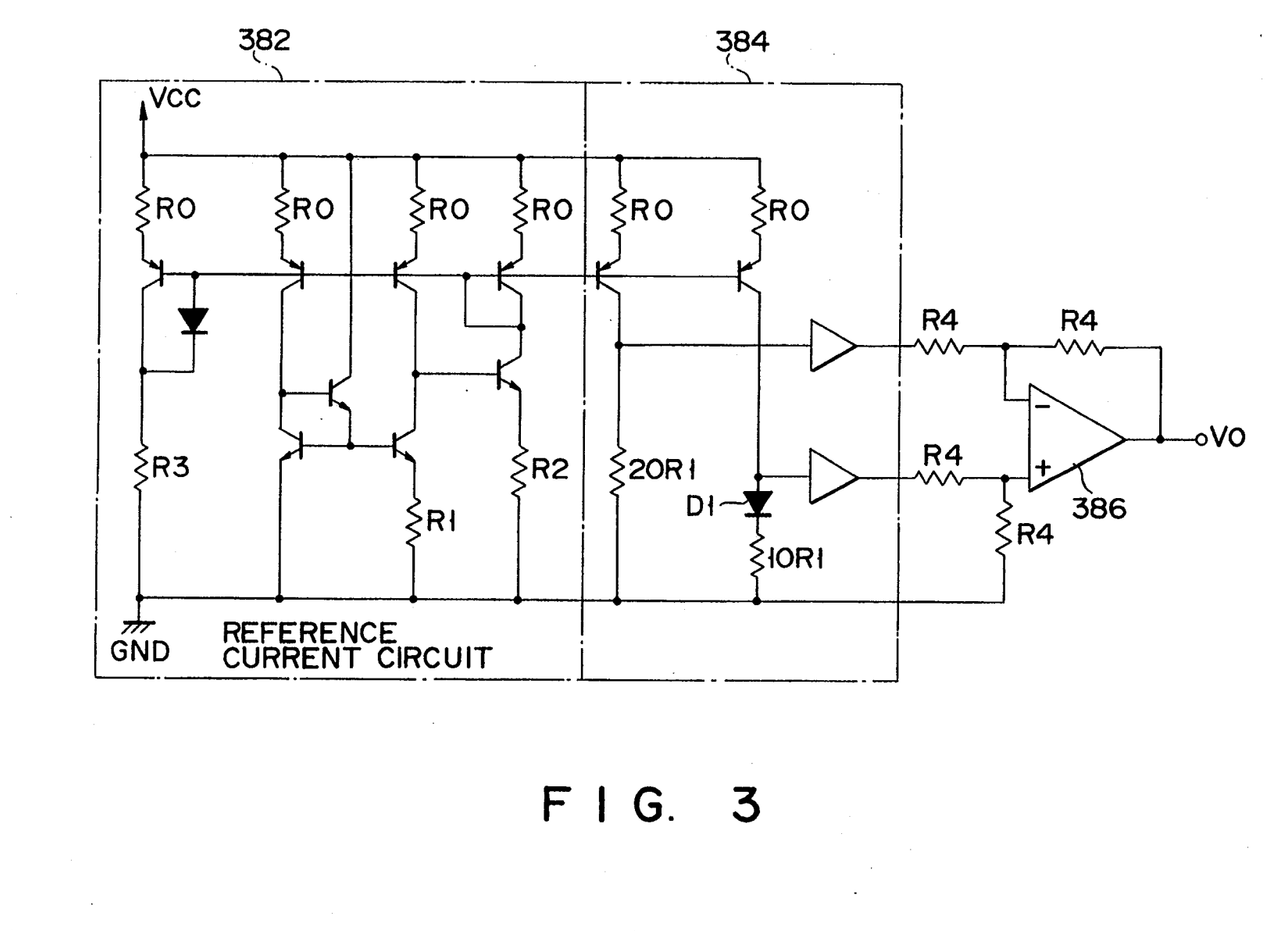
FIG. 3 is a block diagram showing a temperature measuring circuit in FIG. 2.

FIG. 3 shows a detailed circuit arrangement of the temperature measuring circuit block 38. The temperature measuring circuit block 38 is constituted by a reference current circuit 382, a circuit. 384, connected to the reference current circuit 382, for generating a T proportional voltage output, which changes in proportion to the absolute temperature, and a T stable voltage output, which is not influenced by the absolute temperature, and a differential amplifier 386 for obtaining a difference between the two output voltages from the circuit 384.

In the circuit 384, a voltage generated by a resistor 20R1 is represented by $10V_T l_n 10$, where $v_T$ is the thermal voltage and $V_T = (k/q)T$, k is a Boltmann's constant, q is Coulomb charge, and T is the absolute temperature.

Furthermore, in the circuit 384, the anode potential of a diode D1 corresponds to a band gap reference voltage of 1.26 V, which is constant regardless of temperatures. Therefore, an output voltage $V_O$ from the differential amplifier 386 is given by $$V_O = 10V_T l_n 10 - 1.26$$
$$= \frac{10k}{q} l_n 10 \cdot T - 1.26 (V)$$

Consequently, a voltage proportional to the absolute temperature T is output.

Referring back to FIG. 2, the ambient temperature data stored in the digital memory 36 is supplied from terminals M1 and M2 to the terminals C1 and C2 of the CPU 22 through the signal lines DATA and CLOCK. Subsequently, the CPU 22 determines the driving amount of the focusing lens on the basis of the ambient temperature data stored in the digital memory 36 and the distance measurement data from the AFIC 34, and performs driving control in accordance with the determined driving amount.

The focusing lens is driven by, e.g., a DC motor 44 connected between terminals D4 and D5 of a motor driver block 42 in an IFIC (interface IC) 40. The motor driver block 42 drives the motor 44 in accordance with signals CW, CCW, and BRAKE from terminals C7, C8, and C9 of the CPU 22.

A power transmitting mechanism 46 reduces the rotational speed of the motor 44 and transmits power to a focusing lens group 48. The focusing lens group 48 is moved forward or backward depending on power from the power transmitting mechanism 46.

An encoder 50 serves to monitor the driving amount of the focusing lens group 48. The encoder 50 comprises a photointerrupter 56 connected to terminals C10 and C11 of the CPU 22 and having a light-emitting element 52 such as a light-emitting diode, and a phototransistor 54, and a rotating slit 58.

while the focusing lens group 48 is driven, the CPU 22 outputs a driving signal from the terminal C10 to the light-emitting element 52. The rotating slit 58 is a member which is rotated upon rotation of the motor 44. Upon rotation of the rotating slit 58, the encoder 50 outputs an encoder pulse to the terminal C11 of the CPU 22. The CPU 22 monitors the driving amount of the focusing lens group 48 by counting this encoder pulse.

Note that a release switch 60 is connected between a terminal C12 of the CPU 22 and the ground terminal.

A peripheral mechanism for the motor 44 will be described below with reference to FIGS. 4 and 5.

Figure 4:
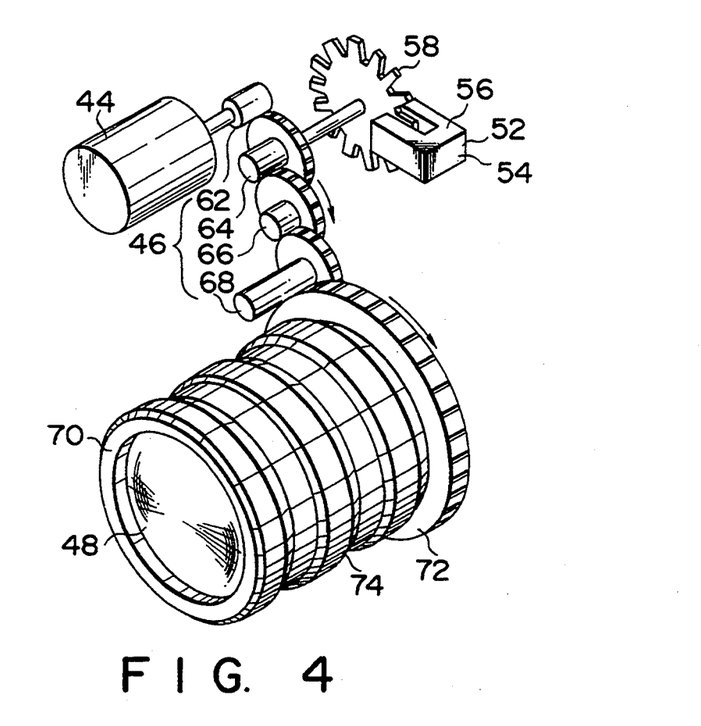
FIG. 4 is a perspective view showing a peripheral mechanism for a focusing motor.
Figure 5:
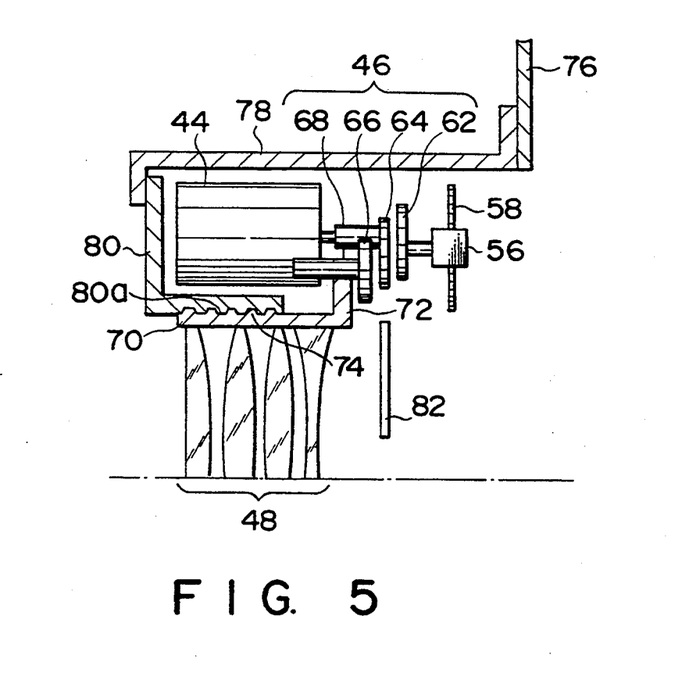
FIG. 5 is a longitudinal sectional view showing the peripheral mechanism for the focusing motor.

Referring to FIGS. 4 and 5, the rotational force of the motor 44 is transmitted to a gear 72 arranged on a focusing frame 70 through a pinion gear 62 fixed to the output shaft of the motor 44 and the power transmitting mechanism 46 constituted by gears 64, 66 and 68 which are sequentially meshed with the pinion gear 62. As a result, the focusing frame 70 is rotated. A helicoid 74 is formed around the focusing frame 70.

A mirror barrel 78 is fixed to a portion 76 of a camera body. In addition, a fixing frame 80 is fixed to the mirror barrel 78. A helicoid is formed on an inner surface 80a of the fixing frame 80 to be meshed with the helicoid 74 formed on the focusing frame 70. The focusing lens group 48 is fixed to the inner surface of the focusing frame 70.

With this arrangement, when the motor 44 is rotated by the direction signal CCW, the focusing frame 70 is moved forward in relation to the fixing frame 80. When the motor 44 is rotated by the direction signal CW, the focusing frame 70 is moved backward in relation to the fixing frame 80. The rotating slit 58 and the reduction gear 64 of the power transmitting mechanism 46 are coaxially arranged and are rotated at the same rotational speed. Note that reference numeral 82 denotes a sector.

Figure 6:
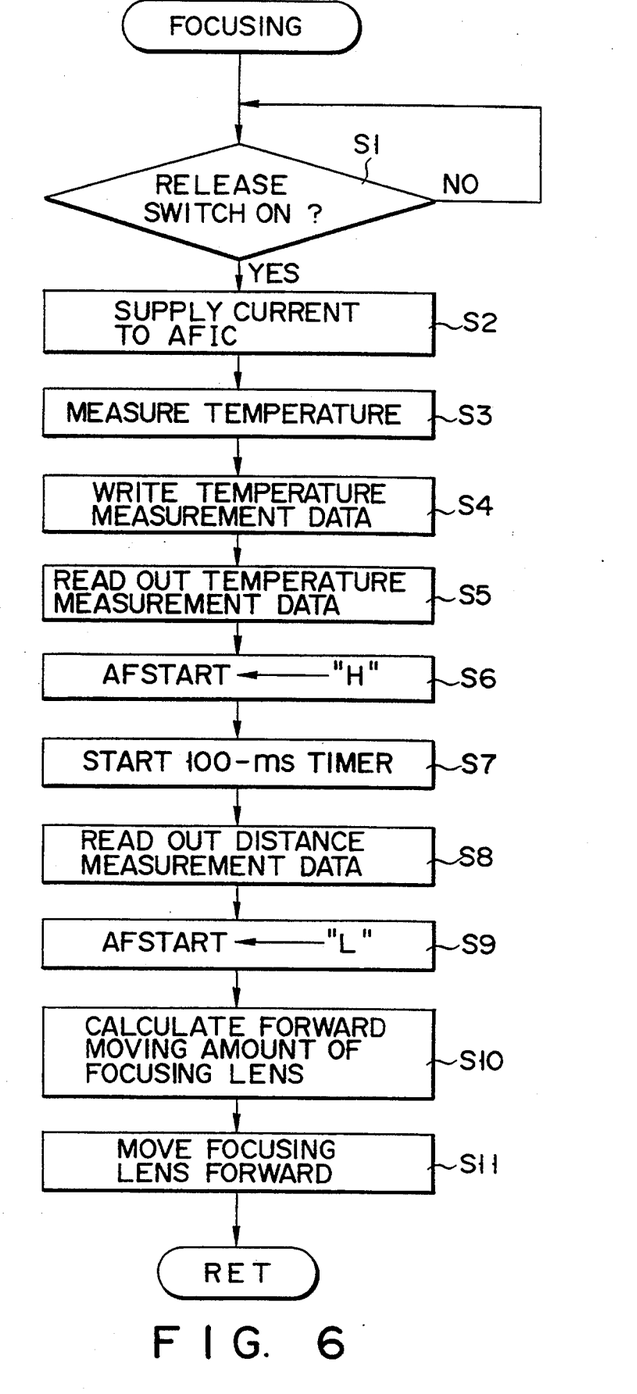
FIG. 6 is a flow chart for explaining a focusing operation.

A focusing operation of the camera having such an arrangement will be described below with reference to FIG. 6. The CPU 22 serves as a control means for controlling the overall sequence of the camera. In this case, however, a focusing operation, of the CPU 22, associated with the present invention will be described.

When the release switch 60 is turned on, a focusing operation is started (step S1). The CPU 22 sets a terminal PW of the AFIC 34 at low level ("L" level) to supply a current to the AFIC 34 (step S2). Subsequently, temperature measurement data from the temperature measuring circuit block 38 is A/D-converted (step S3) into a corresponding digital amount after proper arithmetic processing and is written, as ambient temperature data, at a temperature data storage address in the digital memory 36 (step S4).

Figure 7:
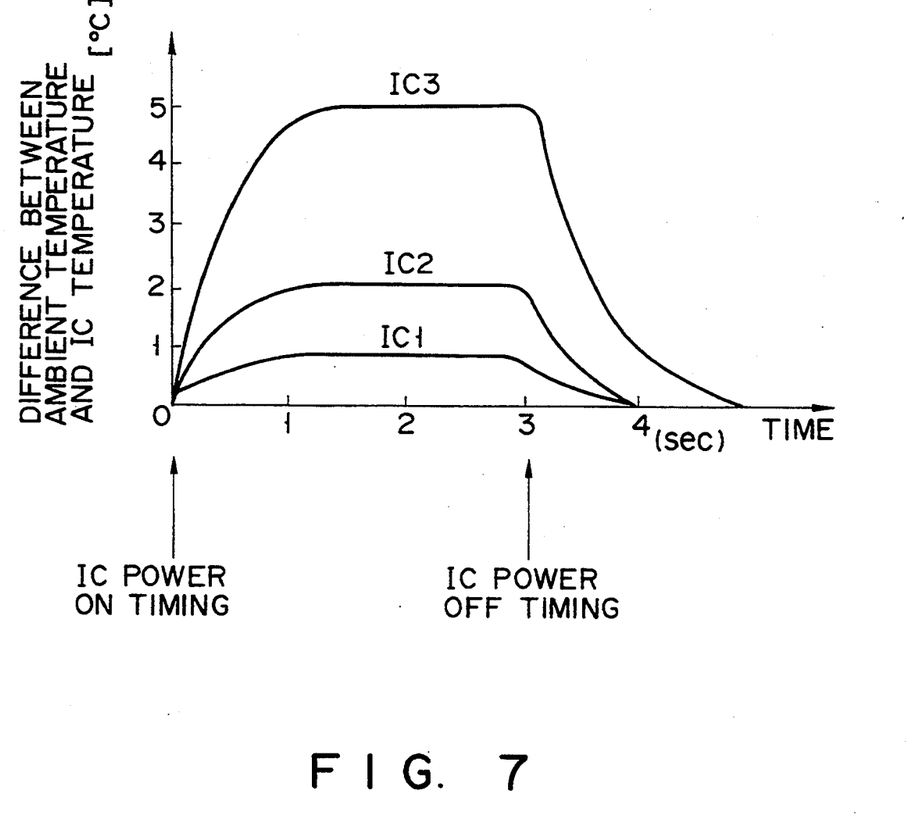
FIG. 7 is a graph showing the differences between ambient temperatures and IC temperatures over time.

As is apparent from FIG. 7, the difference between temperature measurement data and ambient temperature is small immediately after power is supplied to the IC. In this embodiment, therefore, the timing of processing is set such that A/D conversion is performed immediately after power is supplied to the IC.

Subsequently, the CPU 22 reads out the ambient temperature data from the digital memory 36 (step S5) and generates an address based on the ambient temperature data. Table 1 below shows a relationship between ambient temperatures and addresses. The CPU 22 performs data communication with the digital memory 36 to read out data DFOCUS stored at the address from an 8-bit data table used for focus adjustment and stored in the digital memory 36. The read data is then written at an address B0 of a RAM in the CPU 22. Table 2 below shows a relationship between the addresses and the data DFOCUS.

TABLE 1

| Ambient Temperature | Address |
| --- | --- |
| −10° C. or less | C0 |
| −10° C. ~ −5° C. | C1 |
| −5° C. ~ 0° C. | C2 |
| 0° C. ~ 5° C. | C3 |
| 5° C. ~ 10° C. | C4 |
| 10° C. ~ 15° C. | C5 |
| 15° C. ~ 20° C. | C6 |
| 20° C. ~ 25° C. | C7 |
| 25° C. ~ 30° C. | C8 |
| 30° C. ~ 35° C. | C9 |
| 35° C. ~ 40° C. | CA |
| 40° C. or more | CB |

TABLE 2

| Address | DFOCUS |
| --- | --- |
| C0 | 6 |
| C1 | 5 |
| C2 | 5 |
| C3 | 4 |
| C4 | 4 |
| C5 | 3 |
| C6 | 3 |
| C7 | 2 |
| C8 | 2 |
| C9 | 1 |
| CA | 1 |
| DB | 0 |

The CPU 22 outputs a signal AFSTART of high level ("H" level) from the output terminal C6 to the terminal A1 of the AFIC 34 (step S6). The AFIC 34 divides the range of distance within which photographing can be performed into 15 zones, and detects a specific zone in which an object to be photographed is located. The AFIC 4 then outputs the detected zone as a measurement result. Table 3 shows a relationship between object distances and zones (distance measurement results).

TABLE 3

| Distance Measurement Result | Object Distance [m] |
| --- | --- |
| 0 | 6.3 ~ ∞ |
| 1 | 4.2 ~ 6.3 |
| 2 | 3.2 ~ 4.2 |
| 3 | 2.5 ~ 3.2 |
| 4 | 2.1 ~ 2.5 |
| 5 | 1.8 ~ 2.1 |
| 6 | 1.6 ~ 1.8 |
| 7 | 1.4 ~ 1.6 |
| 8 | 1.3 ~ 1.4 |
| 9 | 1.2 ~ 1.3 |
| 10 | 1.1 ~ 1.2 |
| 11 | 1.0 ~ 1.1 |
| 12 | 0.95 ~ 1.0 |

TABLE 3-continued

| Distance Measurement Result | Object Distance [m] |
| --- | --- |
| 13 | 0.9 ~ 0.95 |
| 14 | 0.85 ~ 0.9 |

In response to the signal AFSTART, the AFIC 34 starts a distance measuring operation, and completes the operation within a predetermined period of time (100 ms in this embodiment) (step S7).

Upon outputting the signal AFSTART, the CPU 22 starts a 100-ms timer and waits for the completion of the distance measuring operation by the AFIC 34. When the 100-ms timer ends counting, the CPU 22 performs data communication with the AFIC 34 to fetch 8-bit distance measurement data (step S8). Note that a serial communication method is used in this data communication. More specifically, the 8-bit data is sequentially fetched as a signal DATA through the terminal C1 of the CPU 22 in synchronism with the leading edge of a signal CLOCK from the terminal C2 of the CPU 22. Thereafter, the CPU 22 stores the data, as distance measurement data STEP, at an address C of the RAM.

Upon completion of the data communication with the AFIC 34, the CPU 22 sets the signal AFSTART at low level (step S9), and calculates the forward moving amount of the focusing lens (step S10). A moving amount (encoder pulse count) N of the focusing lens is obtained from the adjustment value DFOCUS for focusing stored at the address B0 of the RAM in the CPU 22 and the distance measurement data STEP stored at the address C of the RAM, according to the following equation:

$$N = DFOCUS + STEP \times 8 + 30$$

One step of the distance measurement data STEP corresponds to eight pulses of the encoder. The adjustment value DFOCUS itself corresponds to a correction amount with respect to the pulse count of the encoder. In addition, constant [30] of the third term of the above equation corresponds to a forward moving amount for [STEP=0]. This forward moving amount corresponds to a mechanical adjustment margin value for absorbing a correction amount when the adjustment value DFOCUS is a negative value.

When the forward moving amount calculation is completed in this manner, a forward moving operation of the focusing lens is performed (step S11). This focusing lens forward moving operation will be described below with reference to FIG. 8.

Figure 8:
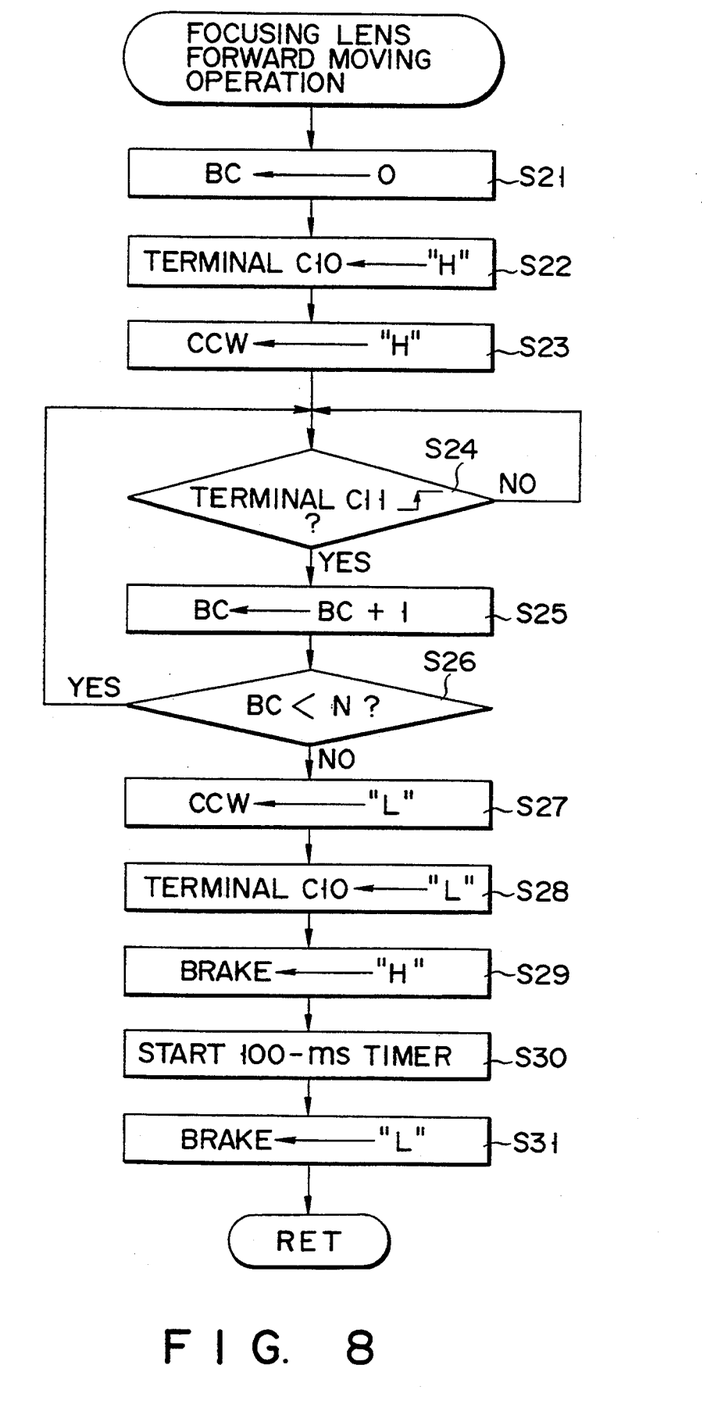
FIG. 8 is a flow chart for explaining a forward moving operation of a focusing lens.

The CPU 22 sets the value of an internal register BC to be "0" (step S21). Thereafter, the CPU 22 sets terminal C10 at high level (step S22) to turn on the light-emitting element 52 in the photointerrupter 56, and sets the direction signal CCW output from the terminal C8 at high level (step S23). In response to the direction signal CCW, the motor driver block 42 supplies a driving current to the motor 44 to rotate it. With this operation, forward movement of the focusing lens group 48 is started.

The CPU 22 monitors the level of the terminal C11, i.e., the output level of the phototransistor 54 (step S24) and adds "1" to the value of the register BC for every change of "L"→"H" (step S25). When the value of the register BC becomes equal to the driving amount (encoder pulse count) N of the focusing lens (step S26), the CPU 22 sets the terminal C8, i.e., the signal CCW at low level (step S27). As a result, the motor driver block 42 stops supplying the current to the motor 44.

The CPU 22 sets the terminal C10 at low level to turn off the light-emitting element 52 (step S28), and subsequently sets the terminal C9, i.e., the signal BRAKE at high level (step S29). As a result, the motor driver block 42 short-circuits the motor 44 to perform a braking operation. The CPU 22 then starts a 100-ms timer (step S30). When the timer ends counting, the CPU 22 sets the terminal C9, i.e., the signal BRAKE, at low level to complete the braking operation (step S31), thus completing the focusing operation.

In this manner, temperature measurement is performed by the temperature measuring circuit block 38 arranged in the AFIC 34 which generates a relatively small amount of heat, and the temperature measurement information is stored in the digital memory 36. Temperature compensating operation is performed with respect to distance measurement data (distance measurement operation result) from the AFIC 34. The focusing motor 44 is driven/controlled in accordance with the temperature compensating operation result. Temperature measurement by the temperature measuring circuit block 38 is performed immediately after power is supplied to the AFIC 34, and the temperature measurement information is stored in the digital memory 36.

With this operation, the influences of heat generated by the IC can be eliminated, and temperature measurement can be performed with high precision by the IC itself without requiring a temperature-measuring resistive element such as a thermistor as in the conventional technique. This provides great merits, in terms of space and cost, to a camera in which reductions in size and cost are important.

Note that temperature measurement information output from the temperature measuring section is preferably stored in the storage section immediately after power is supplied to the IC having a temperature measuring means. Since the amount of heat generated by the IC is small and the difference between the ambient temperature and the IC temperature is small immediately after power is supplied to the IC, temperature measurement can be performed with higher precision.

Temperature measurement by the temperature measuring circuit block 38 is performed immediately after power is supplied to the AFIC 34, i.e., when the amount of heat generated by the IC is small, and the difference between the ambient temperature and the IC temperature is small. Therefore, the measurement of a temperature can be performed with higher precision.

Figure 9:
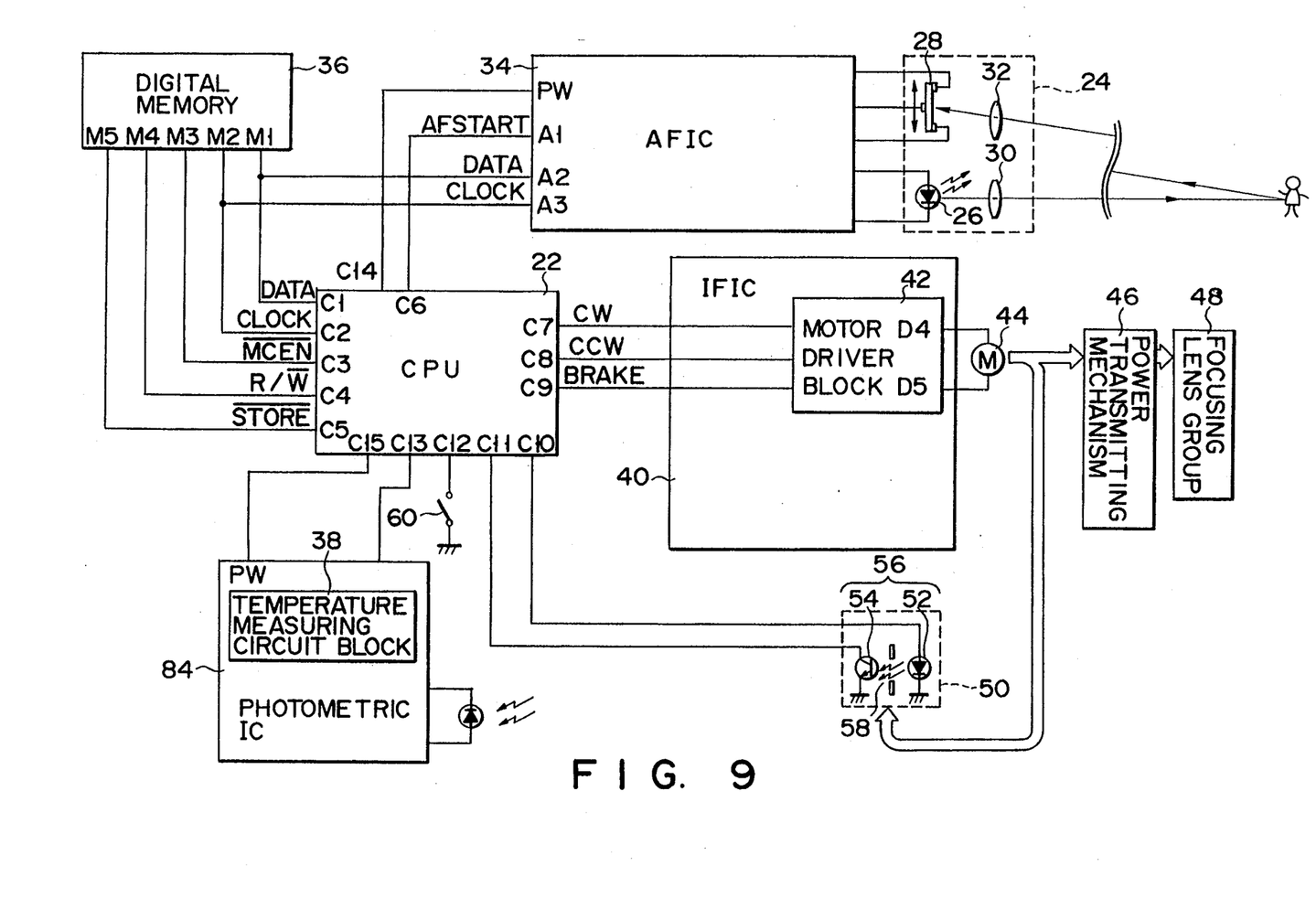
FIG. 9 is a block diagram, showing the overall arrangement, for explaining the second embodiment of the present invention.
Figure 10:
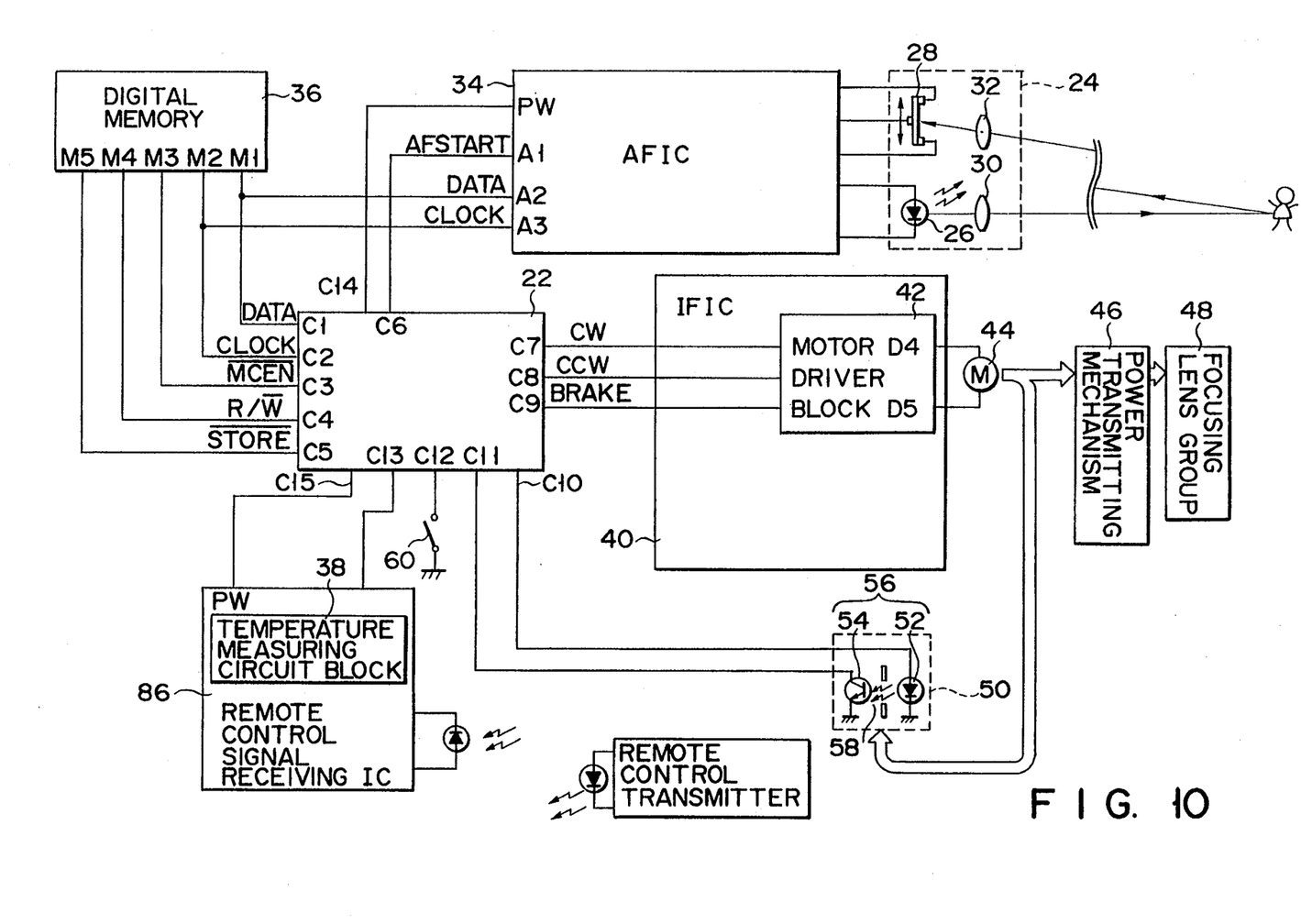
FIG. 10 is a block diagram, showing the overall arrangement, for explaining the third embodiment of the present invention.

FIG. 9 shows the second embodiment wherein a photometric IC 84 is used as a temperature measuring IC. FIG. 10 shows the third embodiment wherein a remote control signal receiving IC 86 is used as a temperature measuring IC. Since these embodiments are similar to the first embodiment, a detailed description thereof will be omitted.

In the above embodiments, a temperature measuring circuit block is not arranged in an IFIC, in which a large amount of heat is generated due to a motor driving operation, but is arranged in an AFIC, a photometric IC, or a remote control signal receiving IC, in which only a small amount of heat is generated. However, a temperature compensating apparatus may be designed such that a current is supplied to only a temperature measuring circuit block during measurement of an IC temperature.

Figure 11:
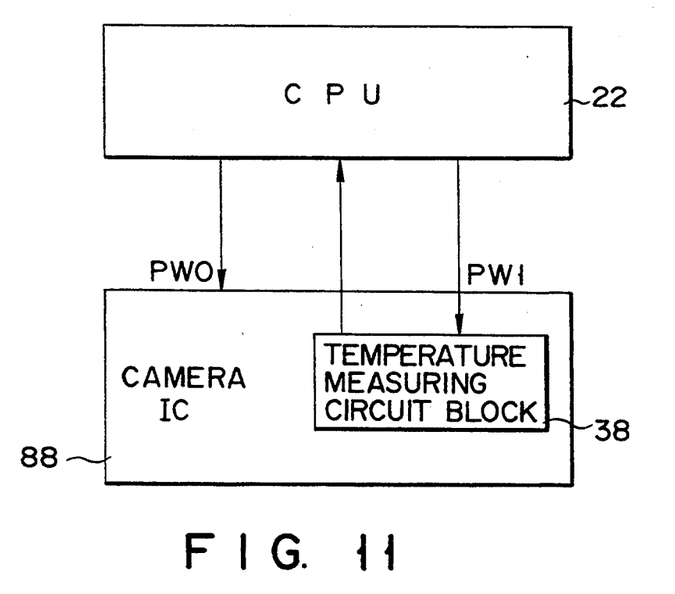
FIG. 11 is a block diagram for explaining a modification of the present invention.

More specifically, as shown in FIG. 11, a camera IC 88, e.g., an AFIC, a photometric IC, or a remote control signal receiving IC, is controlled by a CPU 22 through control lines PW0 and PW1. When a control signal is supplied to the camera IC 88 through the control line PW0, a current is supplied to the overall IC 88 to operate it. If a control signal is supplied to the IC 88 through the control line PW1, only the temperature measuring circuit block 38 is operated. In the latter case, the amount of heat generated by the IC 88 is small, and the difference between the ambient temperature and the IC temperature is reduced, thus allowing high-precision temperature measurement.

In each embodiment described above, the ambient temperature is measured immediately after power is supplied to the IC. However, the present invention is not limited to this. For example, temperature measurement is performed a predetermined period of time after power is supplied to the IC. Thereafter, the difference between the ambient temperature and the IC temperature is corrected by proper processing. Note that if high-precision temperature measurement is not required, the temperature measurement result obtained after the predetermined period of time may be used without any correcting operation.

As shown in FIG. 7, the amount of heat generated by a camera IC varies depending on its type. A temperature measuring circuit block is preferably incorporated in a camera IC which generates a minimum amount of heat. Even if, however, a temperature measuring circuit block is incorporated in an IC which generates a relatively large amount of heat as in the case of IC3 in FIG. 3, a temperature can be accurately measured by performing measurement immediately after power is supplied to the IC.

Furthermore, in each embodiment described above, an external memory is used as a storage means. However, an external memory need not always be used. For example, an internal memory such as a RAM in a CPU may be used.

Figure 12:
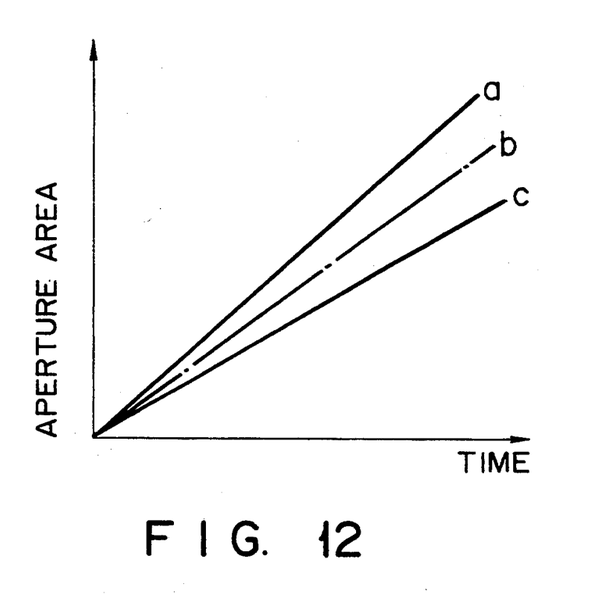
FIG. 12 is a graph, showing a relationship between the aperture area of a shutter and time, for explaining the fourth embodiment of the present invention.

The fourth embodiment will be described below. In this embodiment, the present invention is applied to a shutter driving operation. FIG. 12 is a graph showing changes in aperture area as a function of time. The time integral value of an aperture area corresponds to the exposure value of a film. The relationship between aperture areas and time is influenced by temperature and changes as indicated by lines a and b in FIG. 12. Such changes in the relationship cannot be easily prevented because of changes in driving voltage of a shutter driving motor with temperature changes and load variations due to changes in a friction coefficient, a fitting state, and the like with temperature changes in a period during which a driving force is transmitted to a sector. In such a case, therefore, the ambient temperature is detected in the same manner as described in the first embodiment, and the driving voltage of the shutter driving motor is corrected such that the lines a and b become an ideal aperture characteristic line c. With this operation, a film exposing operation can be stably performed with high precision.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A camera having a temperature compensating function, comprising:
   a motor for performing a focus adjustment of a photographing lens;
   a first IC including:
      a power transistor for driving said motor; and
      a driver circuit, electrically connected to said power transistor, for driving said power transistor, said first IC generating heat while said power transistor is driven;
   a second IC including:
      a distance measuring circuit for measuring a distance to an object to be photographed; and
      a temperature measuring circuit for measuring a temperature of said second IC and for generating second IC temperature data corresponding to the measured temperature of said second IC;
   power supply switching means for supplying power to said second IC;
   wherein the temperature of said second IC is approximately equal to an internal ambient temperature of said camera during a first time period in which said power supply switching means initially supplies power to said second IC, said second IC conducts a distance measurement to measure a distance to said object during a second time period which follows said first time period, and said second IC generates heat during said distance measurement by said distance measuring circuit, whereby a temperature of said second IC rises above the internal ambient temperature of said camera during said second time period;
   calculating means for calculating, after said first time period, a driven amount of said photographing lens based on an object distance data output from said distance measuring circuit;
   a memory for storing second IC temperature data generated by said temperature measuring circuit during said first time period before said distance measuring circuit starts said distance measurement, and for retaining said second IC temperature data in storage;
   correction operation means for correcting said object distance data and said driven amount of said photographing lens in accordance with said stored second IC temperature data; and
   control means for controlling said motor via said driver circuit in accordance with said corrected driven amount of said photographing lens.

2. A camera according to claim 1, wherein said temperature measuring circuit includes:
   a reference current source;
   a temperature proportional voltage output circuit connected to said reference current source, an output from said temperature proportional voltage output circuit changing in proportion to an absolute value of a temperature; and
   a differential amplifier for obtaining a difference between the output of said temperature proportional voltage output circuit and a temperature stable voltage output that is free from influences of the absolute temperature value.

3. A camera according to claim 1, wherein said correction operation means includes:
   a memory for storing a table indicating a relationship between a plurality of internal ambient temperatures and a plurality of correction amounts; and
   reading means for reading out a correction amount by referring to said table in accordance with the internal ambient temperature data, and for adding a correction amount to the object distance data.

4. A camera having a temperature compensating function, comprising:
   a motor for performing a focus adjustment of a photographing lens;
   a first IC including:
      a power transistor for driving said motor; and
      a driver circuit, electrically connected to said power transistor, for driving said power transistor, said first IC generating a given amount of heat while said power transistor is driven;
   a second IC including a distance measuring circuit for conducting a distance measurement to measure a distance to an object to be photographed, and said second IC generating heat during said distance measurement;
   a third IC including a temperature measuring circuit for measuring a temperature of said third IC and for generating a third IC temperature data corresponding to the measured temperature of said third IC, said third IC generating a smaller amount of heat than the amount of heat generated by said first IC while said power transistor is driven;
   power supply switching means for supplying power to said third IC;
   a temperature of said third IC being approximately equal to an internal initial ambient temperature of said camera during a first time period in which said power supply switching means starts supplying power to said third IC;
   said third IC generating an amount of heat during a second time period, which follows said first time period, whereby a temperature inside said camera and a temperature of said second IC rise above said internal initial ambient temperature of said camera;
   storage means for storing third IC temperature data output from said temperature measuring circuit during said first time period before said distance measuring circuit starts said distance measurement, and for retaining said third IC temperature data in storage;
   calculation means for calculating a driven amount of said photographing lens on the basis of an object distance data output from said distance measuring circuit;
   correction operation means for correcting said object distance data and said driven amount of said photographic lens in accordance with said stored third IC temperature data; and
   control means for controlling said motor via said driver circuit in accordance with said corrected driven amount of said photographing lens.

5. A camera according to claim 4, wherein said third IC comprises a photometric circuit means for measuring a brightness of the object.

6. A camera according to claim 4, wherein said third IC comprises a remote control signal receiving circuit means for receiving a signal from a remote control unit, for externally providing a shutter release command.

7. A camera having a temperature compensating function, comprising:

a motor for performing a focus adjustment of a photographing lens;

a driver circuit for driving said motor;

a distance measuring circuit for measuring a distance to an object to be photographed, and for producing object distance data;

a temperature measuring circuit for measuring a self-temperature thereof and for producing circuit temperature data corresponding to said measured self-temperature, the self-temperature of the temperature measuring circuit being approximately equal to an internal initial ambient temperature of said camera during a first time period which is before the start of a distance measuring operation of said distance measuring circuit and in which a power supplying switching means supplies power to said temperature measuring circuit, and the self-temperature of said temperature measuring circuit being higher than said internal initial ambient temperature of said camera during a second time period following said first time period, said distance measuring circuit conducting a distance measuring operation during said second time period and thereby generating heat during said second time period;

an A/D converter for A/D-converting a first circuit temperature data during said first time period to a digital data;

digital storage means for storing the digital data, and for retaining said digital data in storage during said second time period;

calculation means for calculating a driven amount of said photographing lens on the basis of an object distance data output from said distance measuring circuit;

correction operation means for correcting said object distance data and said driven amount of the photographing lens on the basis of said digital data stored in said digital storage means; and control means for controlling said motor through said driver circuit in accordance with said corrected driven amount of said photographing lens.

8. A camera having a temperature compensating function, comprising:

at least one actuator for driving a camera element;

a first IC including a driver circuit, for driving said at least one actuator, said first IC generating a given amount of heat during driving of said at least one actuator;

a temperature measuring circuit, arranged in a second IC, said second IC further including means for performing at least one camera function other than temperature measurement, said temperature measuring circuit of said second IC measuring a temperature of said second IC and generating a second IC temperature data corresponding to the measured temperature of said second IC, said second IC further generating an amount of heat that is smaller than an amount of heat generated in said first IC while said at least one actuator is being driven by said driver circuit of said first IC;

storage means for storing said second IC temperature data in a first time period, during which the temperature of said second IC is approximately equal to an internal initial ambient temperature of said camera while a power source supplies power to said second IC, and during a second time period following said first time period, wherein the internal ambient temperature of said camera and the temperature of said second IC differ from each other due to an amount of heat generated by said second IC during performing of said at least one camera function after receiving power from said power source;

correction operation means for correcting a driven amount of said at least one actuator on the basis of said stored second IC temperature data; and control means for controlling said at least one actuator via said driver circuit in accordance with said corrected driven amount.

9. A camera according to claim 8 wherein said at least one camera function is one of a distance measurement, photographing and communication.

10. A camera according to claim 8, wherein:

said second IC includes distance measuring means for measuring a distance to an object to be photographed;

said camera element comprises a focus adjusting member of a photographing lens; and said correction operation means performs a correcting operation by using the stored second IC temperature data stored in said storage means which corresponds approximately to the internal ambient temperature of said camera, in accordance with an output from said temperature measuring circuit.

11. A camera according to claim 8, wherein said camera element comprises a shutter unit, and said correction operation means calculates a voltage to be applied to a motor of said at least one actuator on the basis of the stored second IC temperature data stored in said storage means which corresponds approximately to the internal ambient temperature data.

12. A camera according to claim 8, wherein said second IC comprises a distance measuring IC for measuring an object distance.

13. A camera according to claim 8, wherein said second IC comprises a photometric IC for measuring an object brightness.

14. A camera according to claim 8, wherein said second IC comprises a remote control signal receiving circuit means for receiving a signal from a remote control unit for externally providing a shutter release command.

15. A camera comprising:

a first IC which generates a given amount of heat;

a second IC, said second IC including:
   a circuit which generates a smaller amount of heat than said given amount of heat generated by said first IC; and
   a temperature measuring circuit for measuring an internal initial ambient temperature of said second IC during a first time period before said circuit of said second IC operates, and for generating internal initial ambient temperature data corresponding to the measured temperature of said second IC;

means for storing said internal initial ambient temperature data; and control means for controlling said camera during a second time period following said first time period in accordance with said internal ambient temperature data stored in said storing means.

16. A camera according to claim 15, wherein said temperature measuring circuit comprises:

a first circuit for generating a first signal that is proportional to an absolute temperature T;

a second circuit for generating a second signal which is not proportional to the absolute temperature T; and a circuit for calculating a difference between the first and the second signals generated by said first and second circuits.

17. A camera comprising:

an actuating member for performing a plurality of focus adjustments of said camera;

a distance measuring IC for conducting a distance measurement for measuring a distance to an object to be photographed, said distance measuring IC including a temperature measuring circuit for measuring a self-temperature of said distance measuring IC and for generating a plurality of circuit temperature data;

power supply switching means for supplying power to said distance measuring IC;

said circuit temperature data being approximately equal to an internal initial ambient temperature of said camera during a first time period in which said power supply switching means initially supplies power to said distance measuring IC and before a distance measurement is conducted;

reading means for reading out initial ambient temperature circuit temperature data from said temperature measuring circuit of said distance measuring IC during said first time period, and for subsequently reading out an object distance data from said distance measuring IC at a predetermined time after said first time period has elapsed;

storage means for storing said initial ambient temperature circuit temperature data read out by said reading means during said first time period before said distance measuring circuit starts a distance measurement, and for retaining said initial ambient temperature circuit temperature data in storage;

means for calculating both a driven amount of said actuating member and an adjustment amount for said calculated driven amount in accordance with said stored circuit temperature data;

means for calculating an actual driven amount of said actuating member in accordance with said adjusted driven amount; and means for driving said actuating member in accordance with said actual driven amount.

18. A camera comprising:

an actuating member for performing a predetermined camera operation;

driving means for driving said actuating member;

temperature measuring means, arranged in a camera IC, for measuring a temperature of said camera IC, and for generating camera IC temperature data;

reading means for reading out camera IC initial ambient temperature data generated during a first time period in which a power source supplies power to the camera IC, and said camera IC initial ambient temperature data read out by said reading means during said first time period corresponding to a temperature which is approximately equal to an internal initial ambient temperature of said camera;

storage means for storing said camera IC initial ambient temperature data read out by said reading means during said first time period;

means for generating control data used in controlling said actuating member;

correction means for correcting said control data in accordance with the camera IC initial ambient temperature data stored in said storage means until said camera IC temperature is approximately equal to the internal ambient temperature of said camera; and means for executing said predetermined camera operation by supplying said corrected control data to said driving means.

19. A camera having a temperature compensating function, comprising:

a temperature measuring circuit, included in a portion of a camera control IC, for measuring an internal ambient temperature of an inside portion of said camera, for measuring an internal temperature of said camera control IC, and for generating internal ambient temperature data, said camera control IC controlling operations of said camera;

said temperature measuring circuit measuring temperature during a first time period during which the internal temperature of said camera control IC is approximately equal to the internal ambient temperature of said inside portion of said camera after a power source supplies power to said camera control IC;

said temperature measuring circuit also measuring a temperature during a second time period after said first period, during which said internal ambient temperature of said inside portion of said camera and said internal temperature of said camera control IC differ from each other due to a quantity of heat generated by said camera control IC after said power source supplies said power to said camera control IC to control operations of said camera;

storage means for storing said ambient temperature data generated during said first time period, and for retaining said stored internal ambient temperature data during said second time period; and control means, at least partly included in said camera control IC, for controlling operations of said camera in accordance with said stored ambient temperature data stored by said storage means.

20. A camera according to claim 19, wherein said temperature measuring circuit comprises:

a first circuit for generating a first signal that is proportional to an absolute temperature T;

a second circuit for generating a second signal which is not proportional to said absolute temperature T; and a circuit for calculating a difference between the first and the second signals generated by said first and second circuits.

21. A camera comprising:

an IC having a temperature measuring circuit arranged in said IC;

said IC further having at least one additional circuit in said IC which is operable for controlling at least one operating function of said camera, said at least one additional circuit in said IC generating heat during operation thereof; and temperature measurement control means for supplying power only to said temperature measuring circuit of said IC, and not to said at least one additional circuit of said IC, to cause said temperature measuring circuit to perform a temperature measuring operation to determine an initial ambient temperature of said IC during a first time period which is prior to supplying power to said at least one additional circuit during a second time period following said first time period.

* * * * *